United States Patent [19]
Cotter

[11] Patent Number: 5,257,457
[45] Date of Patent: Nov. 2, 1993

[54] HAND-HELD TREE GIRDLER

[76] Inventor: Joel M. Cotter, 799 Melody Place, Victoria, British Columbia, Canada, V0X 4M6

[21] Appl. No.: 934,773

[22] Filed: Aug. 24, 1992

[51] Int. Cl.⁵ .................. B26B 23/00; B26B 3/00
[52] U.S. Cl. ........................... 30/121; 30/280; 30/317
[58] Field of Search ............... 30/121, 280, 317, 286, 30/294, 283, 279.6

[56] References Cited

U.S. PATENT DOCUMENTS

| | | | |
|---|---|---|---|
| 278,686 | 6/1883 | Daigneau . | |
| 748,440 | 12/1903 | Underwood . | |
| 1,108,651 | 8/1914 | Worcester | 30/121 |
| 1,149,436 | 8/1915 | Fratt . | |
| 1,631,941 | 6/1927 | Straits | 30/280 |
| 1,818,964 | 8/1931 | Smith | 30/121 |
| 2,655,763 | 10/1953 | Grissett | 30/121 |
| 2,682,106 | 6/1954 | Kinnon | 30/121 |
| 2,699,189 | 1/1955 | McLeod | 144/208 |
| 2,792,670 | 5/1957 | Haynes | 47/1 |
| 2,848,841 | 8/1958 | Kuts | 30/121 |
| 2,870,572 | 1/1959 | Grissett | 30/280 |
| 2,992,483 | 7/1961 | Ricci | 30/280 |
| 3,086,287 | 4/1963 | Cook | 30/121 |
| 3,090,159 | 5/1963 | Wimberley | 47/1 |
| 3,158,956 | 12/1964 | Gudmundsen | 47/1 |
| 4,188,718 | 2/1980 | Vredenburg | 30/121 |
| 4,236,308 | 12/1980 | Vredenburg | 30/121 |
| 4,682,417 | 7/1987 | Henslin et al. | 30/121 |
| 4,996,773 | 3/1991 | Albertson | 30/121 |

*Primary Examiner*—Douglas D. Watts
*Assistant Examiner*—Paul M. Heyrana, Sr.
*Attorney, Agent, or Firm*—Klarquist, Sparkman, Campbell, Leigh and Whinston

[57] ABSTRACT

A compact, hand-held cutting tool for manually girdling trees. The tool is generally L-shaped and includes an elongate body portion having a leading end and a trailing end, and a handle extending laterally from the trailing end for gripping by the operator. The elongate body portion has a substantially planar guide surface for contacting an outer surface section of the tree to be girdled. A generally U-shaped cutting blade is pivotally coupled to the elongate body proximate the trailing end. The angle of inclination of the cutting blade relative to the guide surface is adjustable to achieve an optimum depth cut in trees of varying diameter.

17 Claims, 4 Drawing Sheets

HAND-HELD TREE GIRDLER

FIELD OF THE INVENTION

This application relates to a hand-held cutting tool for manually girdling trees. The tool has an adjustable blade to facilitate cutting of a circumferential groove of optimum depth in trees of varying diameter.

BACKGROUND OF THE INVENTION

In the field of silviculture it is often necessary to eliminate weed trees to allow sunlight and nutrients to permeate the crop trees. In the past, forest workers have eliminated these undesirable weed trees by felling them with chainsaws or by applying herbicides. Both of these techniques have serious limitations. Felling of weed trees often results in damage to surrounding crop trees which defeats the purpose of the procedure. Moreover, felled trees may sprout and regrow over time. The injection of herbicides into notches cut in weed trees with a hatchet is a more effective method of eradication, but it can have a deleterious effect on forest wildlife, especially if the water table is contaminated.

It has been recognized that girdling is a more effective method of killing undesirable trees. This involves cutting a circumferential groove around the tree deeper than the cambium layer of growth to interrupt the flow of water and nutrients. Various hand and power driven tree girdlers are known in the prior art. For example, U.S. Pat. No. 2,792,670 issued 21 May, 1957 to Haynes; U.S. Pat. No. 3,158,956 issued 1 December, 1964 to Gudmundsen; and U.S. Pat. No. 4,996,773 issued 5 March, 1991 to Albertson; all relate to tree girdlers having motorized cutting blades. Such motorized tools are relatively cumbersome and are not suitable for safe use in very dense forests or on steep inclines. Further, chainsaws and other motorized blades have a tendency to cut too deeply, which may cause the girdled tree to topple when subjected to high winds, thus damaging adjacent crop trees. As indicated above, toppled trees may also sprout and regrow over time.

Heretofore, manually driven tree girdling tools have also suffered from significant shortcomings. Generally, such tools have been unable to achieve a deep enough cut and have resulted in tremendous worker fatigue because of their poor leverage design. Other hand-held tree girdlers have proven to be ineffective since they require too much work area around each tree to operate the tool effectively, thus rendering the tool ineffective in dense forest. The tools described in U.S. Pat. No. 3,090,159 issued 21 May, 1963 to Wimberley; and U.S. Pat. No. 4,236,306 issued 2 December, 1980 to Vrendenburg, have limitations in terms of their ability to completely sever the cambium layer, as they do not account for the fact that trees are not perfectly cylindrical. Additionally, such tools require two-handed operation which contributes to unsafe working conditions when on steep grades or uneven terrain.

Accordingly, the need has arisen for a compact, hand-held tool for efficiently girdling trees of varying diameter.

SUMMARY OF THE INVENTION

In accordance with the invention there is provided a hand-held tool for girdling trees which includes an elongate body having a guide surface for contacting an outer surface section of a tree, the body having a leading end and a trailing end; a handle extending laterally from the elongate body; a cutting blade pivotally coupled to the elongate body proximate the trailing end and at an angle relative to the guide surface; and adjustment means for manually adjusting the angle of inclination of the cutting blade relative to the guide surface.

Preferably the guide surface is substantially planar and the elongate body further includes opposed side surfaces extending generally perpendicular to the guide surface in spaced relation.

Advantageously, the cutting blade is generally U-shaped having an arcuate portion and opposed end portions, the end portions being securely fastened to respective side surfaces of the elongate body to define a space between the arcuate portion and the guide surface. A first fastener is provided for extending between the elongate body side surfaces for pivotally coupling the cutting blade to the elongate body.

The adjustment means is further for incrementally displacing the cutting blade end portions longitudinally along the body to pivot the cutting blade about the first fastener. Advantageously, the elongate body has an internal cavity formed therein and the adjustment means further comprises an externally threaded rod extending longitudinally within the body and through the cavity; a second fastener extending transversely between the cutting blade end portions and through the cavity, and having an internally threaded bore for receiving the threaded rod, for axial displacement of the second fastener within the cavity upon rotation of the rod; and means for manually rotating the rod.

Preferably, the threaded rod extends longitudinally within the elongate body between the leading and trailing ends, and the means for manually rotating the rod consists of a nut secured to the rod at the leading end.

The handle is preferably integrally connected to the elongate body at the trailing end. Advantageously, the handle extends substantially perpendicular to the elongate body such that the tool is generally L-shaped.

Preferably the leading end of the elongate body is tapered in a direction away from the guide surface to prevent the guide surface from jamming into knots or other protrusions on the outer surface of the tree as the tool is guided around the tree circumference. The trailing end of the elongate body is also tapered in a direction away from the guide surface to prevent the strip of bark and cambium peeled away from the tree from becoming clogged within the U-shaped cutting blade.

BRIEF DESCRIPTION OF THE DRAWINGS

In drawings which illustrate the preferred embodiment of the invention, but which should not be construed as restricting the spirit or scope of the invention in any way.

DETAILED DESCRIPTION OF THE PREFERRED EMBODIMENT

Figure 1:
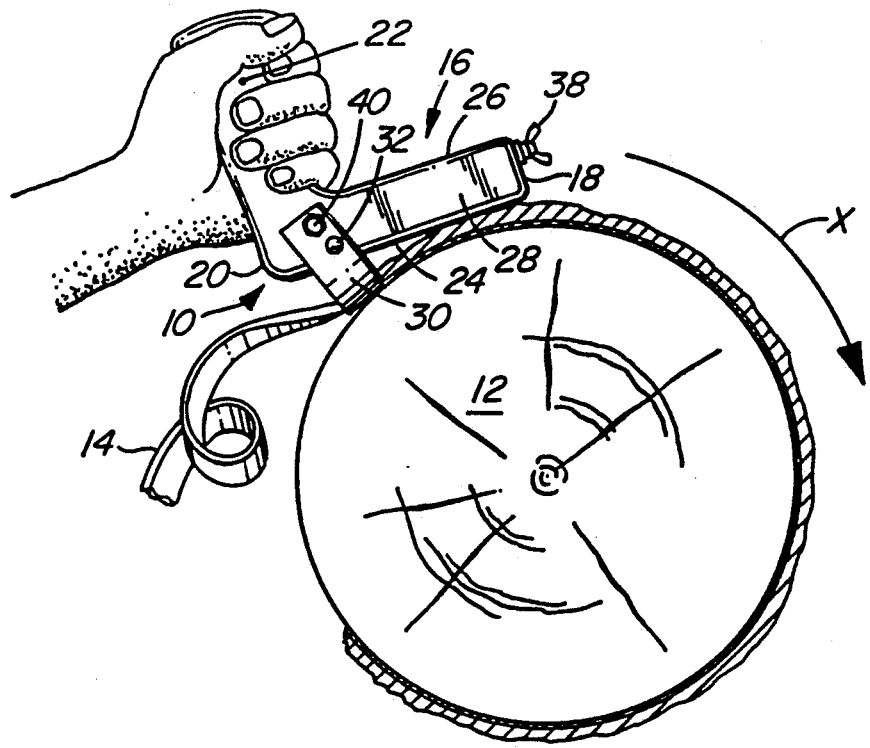
FIG. 1 is a plan view of the girdling tool in its operating position cutting a strip of bark and cambium from a tree shown in cross-section.
Figure 2:
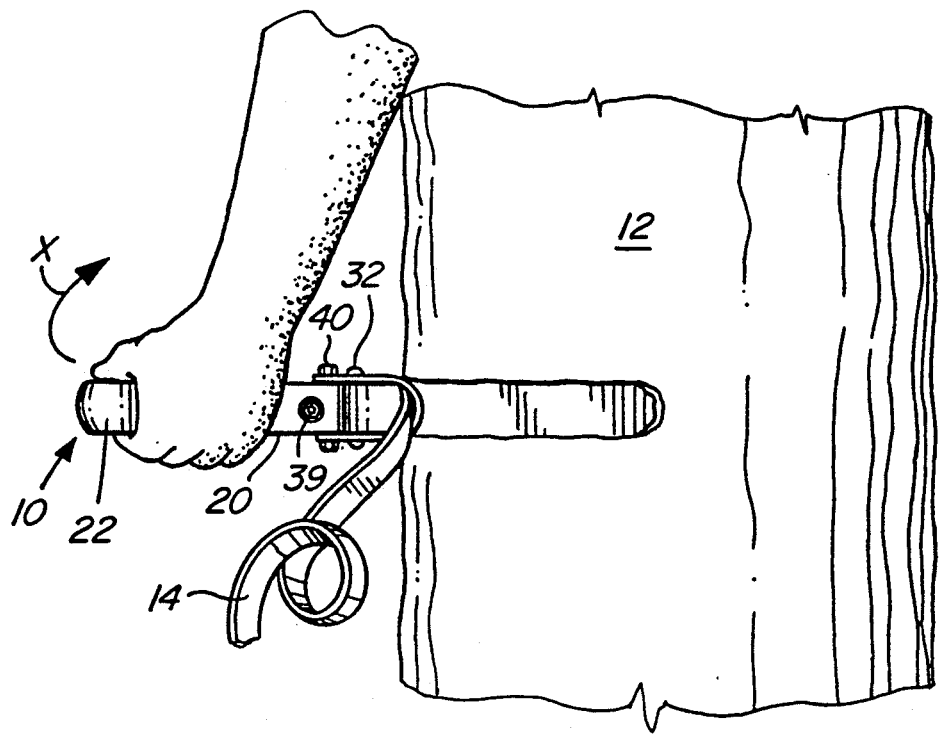
FIG. 2 is a perspective view of the trailing end of the tool of FIG. 1.

FIGS. 1 and 2 depict a compact, hand-held tool 10 for girdling a tree 12. Tool 10 may be manually pushed or pulled around the circumference of tree 12 to remove a narrow ring 14 of bark and cambium. The purpose of girdling is to completely sever the cambium layer of regrowth of tree 12, thereby preventing translocation of water and nutrients through the trunk from the root system to the leaves.

Tool 10 is generally L-shaped and includes an elongate body portion 16 having a leading end 18 and a trailing end 20. A handle 22 extends laterally from body trailing end 20. Body 16 and handle 22 are preferably fabricated from a solid piece of cast aluminum or steel. Preferably, handle 22 is ergonomically shaped to enable tool 10 to be comfortably gripped and operated with one hand (FIGS. 1-3).

Body portion 16 has a substantially planar guide surface 24 for contacting an outer surface section of tree 12, a second surface 26 extending in a plane parallel to surface 24, and a pair of opposed side surfaces 28 which extend between surfaces 24 and 26. Body side surfaces 28 are preferably spaced approximately 1 inch (2.5 cm) apart.

Figure 5:
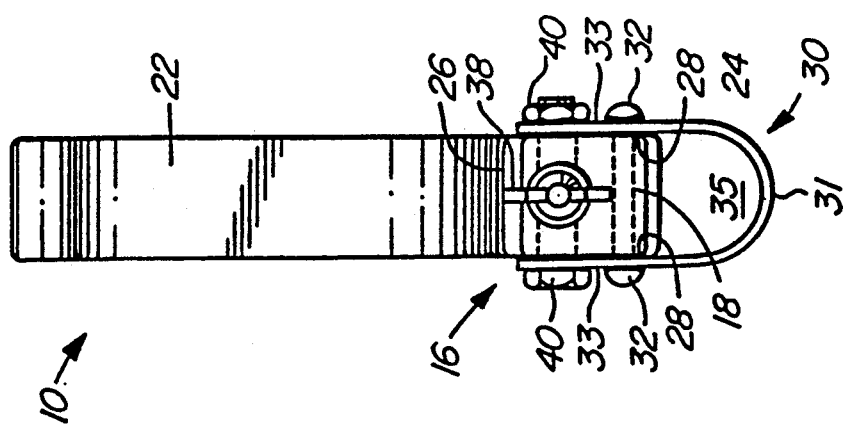
FIG. 5 is an end elevational view of the girdling tool.

Tool 10 also includes a U-shaped cutting blade 30 which is pivotally coupled to body 16 proximate trailing end 20 by means of a first fastener 32. Blade 30 is fabricated from a flat piece of high carbon steel which is bent into the desired U-shape to define an arcuate portion 31 (FIG. 5) and a pair of planar end portions 33. Blade end portions 33 are pivotally secured to opposed side surfaces 28 of body 16 by first fastener 32. Blade 30 is positioned so that a space 35 is defined between guide surface 24 and blade arcuate portion 31.

Figure 3:
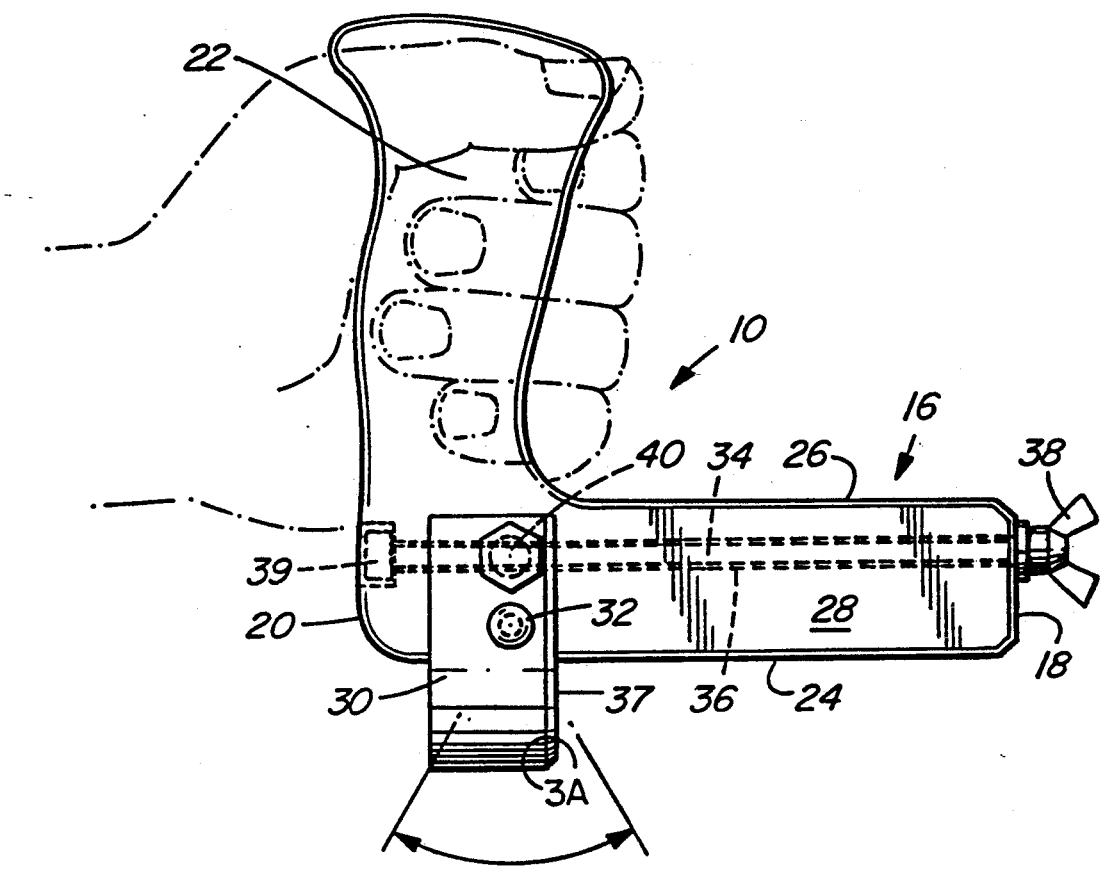
FIG. 3 is a side elevational view of the girdling tool.
Figure 3A:
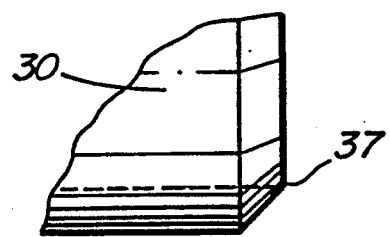
FIG. 3(a) is an enlarged detail view of the cutting edge of the cutting blade.

As best shown in FIGS. 3 and 3(a), the cutting edge 37 of blade 30 (i.e. the edge closest leading end 18) is ground to a sharp point. Preferably, cutting edge 37 is tapered at an angle of approximately 60° relative to the adjacent outer surface of blade 30.

As discussed in further detail below, guide surface 24 is adapted to contact an outer surface section of tree 12 in advance of cutting blade 30 when tool 10 is used in the field. The leading edge 18 of elongate body 16 is tapered (i.e. a wedge-shaped piece is cut off the lower end of body 16) to prevent guide surface 24 from jamming into knots or other protrusions as tool 10 is guided around the circumference of tree 12. The trailing end 20 of elongate body 16 is arcuately tapered where it merges with handle 22. This ensures that the narrow ring 14 of bark and cambium which is continuously peeled away from tree 12 does not become clogged within space 35 (FIGS. 1 and 2).

An important feature of the invention is the provision of "adjustment means" for varying the angle of inclination of blade 30 relative to guide surface 24. This enables tool 10 to be adjusted to produce optimum depth cuts in trees 12 of varying diameter. Preferably, blade 30 is oriented so that cutting edge 37 extends approximately ⅜ of an inch (1 cm) beneath the inner bark layer into the xylem or woody portion of the tree to ensure that the cambium layer of growth is entirely severed.

Figure 4:
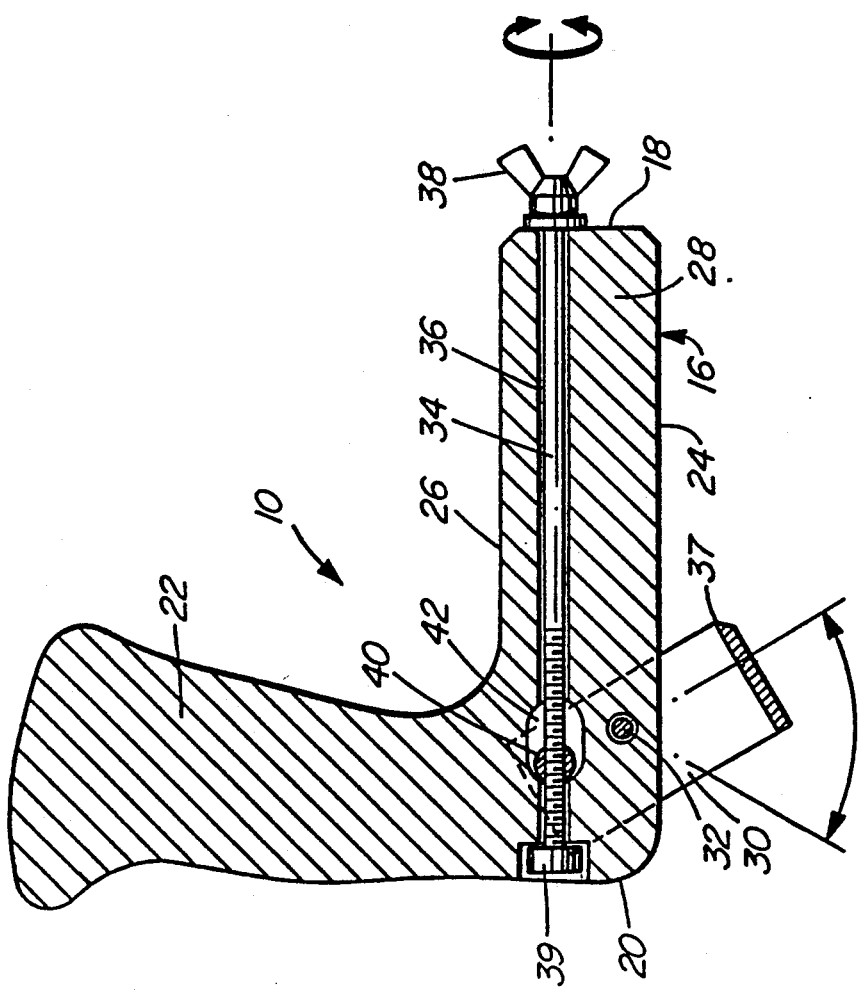
FIG. 4 is a longitudinal sectional view of the girdling tool showing the cutting blade pivoted toward the leading end of the tool.
Figure 6:
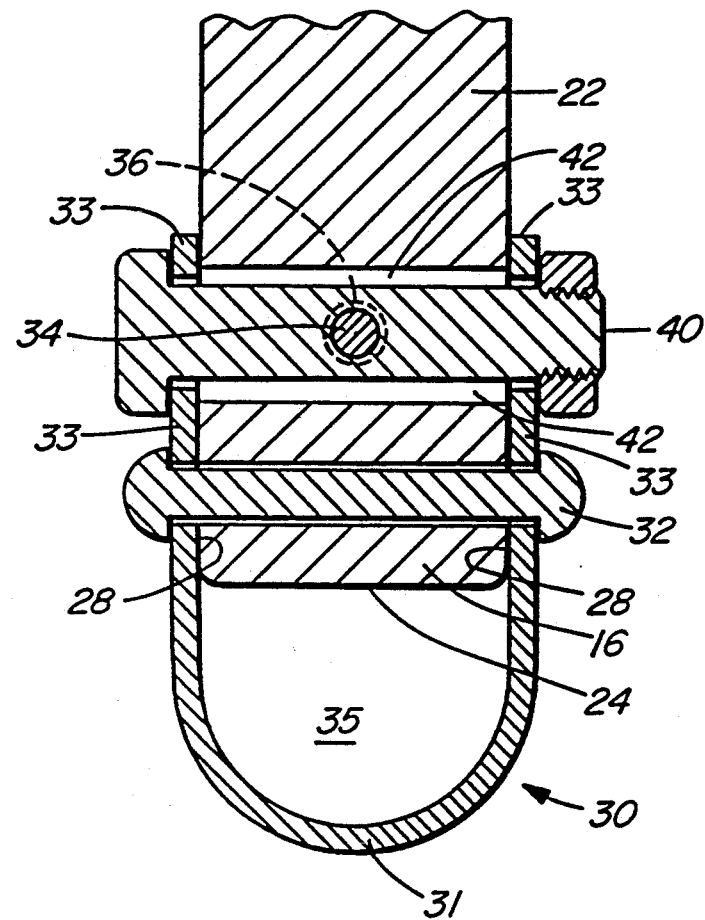
FIG. 6 is an enlarged transverse sectional view taken through the cutting blade.

The "adjustment means" preferably consists of an externally threaded rod 34 which is rotatable within a borehole 36 extending longitudinally within elongate body 16 between ends 18 and 20. A wing nut 38 is secured to rod 34 at end 18 for manually rotating rod 34. A bolt 39 is mounted at trailing end 20 for restraining axial movement of rod 34 (FIGS. 3 and 4). The adjustment means further includes a second fastener 40 which extends transversely between blade end portions 33 through a cavity 42 formed in elongate body 16 (FIG. 4). As best shown in FIG. 6, fastener 40 has an internally threaded borehole for receiving rod 34. Accordingly, rotation of rod 34 displaces fastener 40 rearwardly or forwardly within cavity 42 along the longitudinal axis of elongate body 16. Displacement of second fastener 40 in turn causes cutting blade 30 to pivot about first fastener 32 to incrementally adjust the angle of blade cutting edge 37 relative to guide surface 24. The threaded coupling between rod 34 and second fastener 40 ensures that blade 30 will not pivot away from its preferred orientation when blade 30 bites into tree 12.

As shown best in FIG. 3, fasteners 32 and 40 are longitudinally offset slightly toward the cutting edge 37 of blade 30. This ensures that cutting edge 37 will not approach too closely to guide surface 24 when blade 30 is pivoted toward leading end 18 as shown in FIG. 4. Preferably the minimum displacement between cutting blade arcuate portion 31 and guide surface 24, through the arc of rotation of blade 30 about first fastener 32, ranges between about 0.5 to 1.0 inches. The radius of the arc of rotation is preferably about 1.5 inches for optimum adjustability of tool 10. As shown best in FIG. 6, fasteners 32 and 40 extend in parallel relation and are preferably spaced approximately 0.5 inches apart.

In operation, tool 10 is designed for girdling trees of between approximately 4-50 cm in diameter at breast height. As shown in FIG. 1, tool 10 is initially positioned so that guide surface 24 rests against an outer surface section of tree 12 and handle 16 extends outwardly away from tree 12 for gripping by the operator. The angle of inclination of cutting blade 30 relative to guide surface 24 may then be adjusted as described above to suit the diameter of the tree 12 to be girdled. In particular, the operator need only turn wing nut 38 to rotate rod 34, which in turn causes longitudinal displacement of second fastener 40. This causes cutting blade 30 to incrementally pivot about first fastener 32 until the desired cutting angle is obtained. For example, for smaller diameter trees 12, blade 30 is pivoted toward leading end 18 as shown in FIG. 4. For larger diameter trees, blade 30 may be pivoted in the opposite direction toward trailing end 20.

Blade 30 is preferably adjusted so that the cambium layer of the tree is completely severed to prevent translocation of water and other nutrients. If the cut is too shallow, then the cambium layer may be not completely severed, which may allow the tree tissue to regenerate. If the cut is too deep, then tree 12 may become unstable and prone to topple when subjected to high winds. Trees which are blown down in this fashion often cause damage to surrounding crop tree species, which defeats the purpose of the girdling procedure. Moreover, girdled trees which have toppled may regrow if they break off at the stump.

After the angle of inclination of cutting blade 30 relative to guide surface 24 has been adjusted as aforesaid, the operator manually pushes or pulls tool 10 around the circumference of tree 12 as shown in FIGS. 1 and 2. Guide surface 24 of elongate body 16 travels around tree 12 in advance of cutting blade 30 to enable the application of a levering force to blade 30. That is, the application of a pushing or pulling force to handle 22 in the direction of arrow "X" (i.e generally tangential to the outer surface of tree 12) causes planar guide surface 24 to firmly engage the outer surface of tree 12 to maintain blade 30 in the preferred cutting orientation.

As best shown in FIG. 1, the leading end 18 of elongate body 16 is tapered to prevent guide surface 24 from jamming into knots or other protrusions formed on the outer surface of tree 12. As tool 10 circumscribes tree 12 as aforesaid, cutting blade 30 removes a narrow strip 14 of bark and cambium from tree 12 which is fed rearwardly through space 35 defined between guide surface 24 and arcuate portion 31 of cutting blade 30 (FIGS. 1 and 2). The trailing end of elongate body 16 is also arcuately tapered where it merges with handle 22 to prevent strip 14 from becoming clogged within space 35 as it is peeled away from tree 12 (FIGS. 1 and 2).

A major advantage of tool 10 over other prior art designs is its compact size. Tool 10 is particularly suitable for use in dense forests where there is very little clearance between adjacent trees. Further, since tool 10 may be readily manipulated with one hand, it is suitable for use on steep forest slopes and the like where one hand is required to safely brace the operator.

Another major advantage of tool 10 is that it yields a consistent depth of cut, irrespective of ridges or undulations formed on the outer surface of tree 12. This is important to ensure that the cambium layer of growth is entirely severed to prevent regeneration of the girdled tree.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed:

1. A hand-held tool for girdling trees, said tool comprising:
   a) an elongate body having a leading end and a trailing end;
   b) a handle extending laterally from said elongate body trailing end;
   c) a cutting blade pivotally coupled to said elongate body proximate said trailing end;
   d) a guide surface on said elongate body between said leading end and said cutting blade for slidingly engaging an outer surface section of a tree in advance of said cutting blade, thereby enabling the application of a levering force to said cutting blade; and
   e) adjustment means for adjustably inclining said cutting blade at an angle relative to said guide surface.

2. A tool as defined in claim 1, wherein said elongate body further comprises opposed side surfaces extending generally perpendicular to said guide surface in spaced relation.

3. A tool as defined in claim 2, wherein said cutting blade is generally U-shaped having an arcuate portion and opposed end portions, and wherein said end portions are securely fastened to respective side surfaces of said elongate body to define a space between said arcuate portion and said guide surface.

4. A tool as defined in claim 3, further comprising a first fastener extending transversely between said elongate body side surfaces for pivotally coupling said cutting blade end portions to said side surfaces.

5. A tool as defined in claim 4, wherein said adjustment means is further for incrementally displacing said cutting blade end portions longitudinally along said body, to pivot said cutting blade about said first fastener.

6. A tool as defined in claim 5, wherein said elongate body further comprises an internal cavity formed therein proximate said trailing end and wherein said adjustment means further comprises:
   a) an externally threaded rod extending longitudinally within said body, and through said cavity;
   b) a second fastener extending transversely between said cutting blade end portions and through said cavity, and having an internally threaded bore for receiving said threaded rod, for axial displacement of said second fastener within said cavity upon rotation of said rod; and
   c) means for manually rotating said rod.

7. A tool as defined in claim 6, wherein said threaded rod extends longitudinally within said elongate body between said leading and trailing ends and wherein said means for manually rotating said rod comprises a nut secured to said rod at said leading end.

8. A tool as defined in claim 3, wherein the angle of inclination of said cutting blade relative to said guide surface is adjustable between about 60 and 120 degrees.

9. A tool as defined in claim 3, wherein said cutting blade is pivotable relative to said body through an arc of rotation, and wherein the minimum displacement between said cutting blade arcuate portion and said guide surface ranges between about 0.5 to 1.0 inches through said arc of rotation.

10. A tool as defined in claim 9, wherein the radius of said arc of rotation is between about 1.0 to 1.5 inches.

11. A tool as defined in claim 6, wherein said cutting blade further comprises a cutting edge closest said leading end and a trailing edge closest said trailing end, and wherein said first and second fasteners are longitudinally offset toward said cutting edge.

12. A tool as defined in claim 11, wherein said first and second fasteners extend in parallel relation and are spaced approximately 0.5 inches apart.

13. A tool as defined in claim 1, wherein said handle is integrally connected to said elongate body at said trailing end.

14. A tool as defined in claim 13, wherein said handle extends substantially perpendicular to said elongate body such that said tool is generally L-shaped.

15. A tool as defined in claim 1, wherein said guide surface is substantially planar.

16. A tool as defined in claim 15, wherein said elongate body trailing end is tapered proximate said cutting blade in a direction away from said guide surface.

17. A tool as defined in claim 15, wherein said elongate body leading end is tapered in a direction away from said guide surface.

* * * * *